(12) United States Patent
Nagel

(10) Patent No.: US 6,232,912 B1
(45) Date of Patent: May 15, 2001

(54) METHOD FOR DETECTING A TARGET BY MEANS OF A HIGH PULSE REPETITION FREQUENCY RADAR SYSTEM

(75) Inventor: Dieter Nagel, Erbach (DE)

(73) Assignee: Daimler-Benz Aerospace AG, Munich (DE)

( * ) Notice: Subject to any disclaimer, the term of this patent is extended or adjusted under 35 U.S.C. 154(b) by 0 days.

(21) Appl. No.: 09/192,333

(22) Filed: Nov. 16, 1998

(30) Foreign Application Priority Data

Nov. 15, 1997 (DE) .............................................. 197 50 7425

(51) Int. Cl.$^7$ ...................................................... G01S 13/22
(52) U.S. Cl. ............................ 342/137; 342/27; 342/104; 342/105; 342/109; 342/110; 342/118; 342/134; 342/135; 342/136; 342/195; 342/196
(58) Field of Search .................................. 342/27, 28, 73, 342/82, 89, 98, 104, 105, 109, 110, 118, 134–144, 194, 202, 203, 204, 195, 196

(56) References Cited

U.S. PATENT DOCUMENTS

| | | | |
|---|---|---|---|
| 4,053,884 | * 10/1977 | Cantrell et al. | 342/109 |
| 4,642,641 | * 2/1987 | Campbell | 342/82 |
| 5,726,657 | * 3/1998 | Pergrande et al. | 342/202 |

* cited by examiner

*Primary Examiner*—Bernarr E. Gregory
(74) *Attorney, Agent, or Firm*—Venable; Catherine M. Voorhees

(57) ABSTRACT

The invention particularly relates to the detection of fast-flying targets by means of an HPRF radar system that operates with a plurality of switchable pulse-repetition frequencies (PRFs). In the method, a high velocity resolution is attained, which permits a reliable detection of a multiple-target situation. At the same time, a precise range determination is attained with a high range resolution by means of a pure transit-time measurement of the pulses. The length of the used range gates is selected to correspond to the anticipated target length.

19 Claims, 7 Drawing Sheets

METHOD FOR DETECTING A TARGET BY MEANS OF A HIGH PULSE REPETITION FREQUENCY RADAR SYSTEM

BACKGROUND OF THE INVENTION

The invention is based on a method of detecting a target by means of an HPRF radar system.

The invention particularly relates to the detection of fast-moving targets, such as aircraft, by means of a pulse-Doppler radar system. Here a sequence (burst) of generally modulated pulses is emitted by a transmitter/receiver antenna. These pulses are reflected at a target to be detected, for example an aircraft, and received by the transmitter/receiver antenna. The evaluation of the measured transit time, or Doppler shift, of the pulses permits a determination of the velocity and the range of the target. Interfering ambiguities can occur in a manner known per se, particularly in the determination of the target range. Specifically, an unambiguous distance range exists for each predeterminable Pulse-Repetition Frequency (PRF). The higher the PRF is selected to be, the smaller the unambiguous distance range. On the other hand, even with fast-moving targets, such as fast aircraft, a high PRF (HPRF, "High Pulse Repetition Frequency") is required for attaining the highest-possible unambiguous velocity range. If there should be a large, expanded unambiguous distance range having a predeterminable, high unambiguous speed range, it is obvious to use an HPRF radar system having at least two switchable PRFs. In this case, generally a change in the PRF occurs with each emission of a burst, that is, switching generally occurs cyclically between the used PRFs. The received echo pulses associated with each PRF are then evaluated and compared to those of other PRFs. With the assumption that a target is impacted by the pulses of numerous different PRFS, both the target velocity and its range can be determined in the expanded unambiguous distance range.

SUMMARY OF THE INVENTION

It is the object of the invention to improve a generic method so as to attain a high unambiguous velocity range with a high velocity resolution and a high range resolution in a predeterminable, expanded unambiguous distance range, particularly for fast-moving targets.

This object is accomplished by the features of the present invention. Advantageous embodiments and/or modifications are also described.

BRIEF DESCRIPTION OF THE DRAWINGS

The invention is described in detail below by way of embodiments, with reference to schematic figures in which: FIGS. 1 through 13 are schematic diagrams for explaining the invention. Specifically, FIG. 1 shows an example of an encoded transmission signal in which a Barker code with L=5 is used.

FIG. 2 shows a flying aircraft FL, whose radar antenna A has detected another moving target.

FIG. 3 illustrates the folding of the reception signal y (l) with the matched filter $m_F$ (l)

FIG. 4 shows a time-range matrix formed using formula (8).

FIG. 5 illustrates a frequency-range matrix formed by means of applying a Fourier transformation to the time-range matrix.

FIG. 6 shows a course over time of a predeterminable processing cycle, in which x different PRFs, are used.

FIG. 7 shows the results of the process which creates a compensated matrix $F_{jk}(m,i)$ when $v_f>0$.

FIG. 8 shows the double range gates.

FIGS. 9a through 9d show the possible range positions of the a target (represented by x) in different range gates associated with different PRFs.

FIG. 11 shows an associated utilization diagram as a function of the range at four different PRFs.

FIG. 13 shows the scenario for a multiple-target resolution in the velocity direction, taking into consideration a constant change in target velocity.

DETAILED DESCRIPTION OF THE INVENTION

An HPRF radar system that is known per se is used in the method described below. This system particularly comprises a (radar) antenna for emitting pulsed transmission signals in a predeterminable (radar) frequency range and for receiving the corresponding echo signals. These signals are mixed down in a manner known per se in a predeterminable intermediate-frequency range and then demodulated, yielding pulses from which both the velocity and the range of one or more targets can be determined by means of a transit-time measurement.

The (radar) antenna emits a transmission signal according to the formula:

$$s(t) = \left(\sum_{i=0}^{N-1} b_\tau(t-iT)\right) \cdot e^{j \cdot 2\pi f_0 \cdot t}. \tag{1}$$

Figure 1:
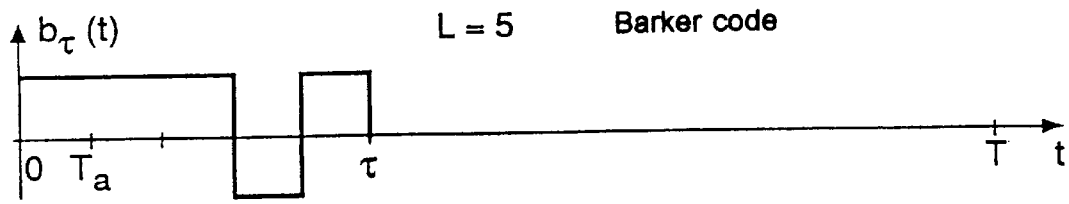

This signal comprises an encoded signal $b_\tau(t)$, which repeats periodically in the time T, and is modulated with the term $e^{j \cdot \pi f_0 \cdot t}$, where $f_0$ represents the used transmission frequency, for example 10 GHz. N represents the number of emitted encoded signals $b_\tau(t)$. FIG. 1 shows an example for an encoded transmission signal, in which a barker code with L=5 is used.

Figure 2:
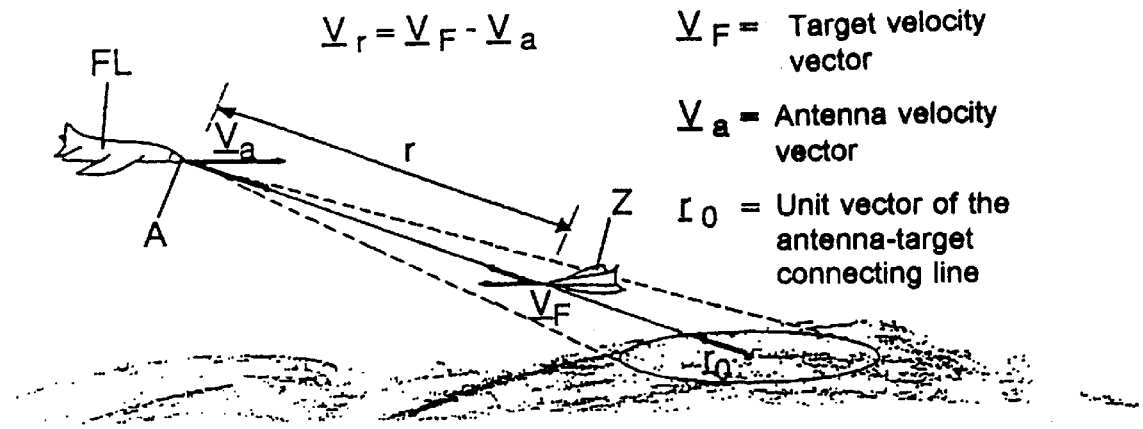

FIG. 2 shows a flying aircraft FL, whose (moved) (radar) antenna A has detected another moving target Z. This target is at a range r from the antenna A, and approaches it at a relative velocity $V_r \cdot r_0$, with $V_r = V_F - V_a$, where $r_0$ represents the unit vector on the connecting line from the antenna A to the target Z, $V_F$ represents the velocity vector of the target Z, $V_a$ represents the velocity vector of the antenna A, and $V_r$ represents the resulting velocity vector.

With the assumption of a non-fluctuating (constantly-present) target Z, the transmission signals are continuously reflected at this target over time according to Formula (1), resulting in echo signals that are received by the antenna A. After a demodulation with the transmission frequency $f_0$, and a subsequent analog/digital conversion, a reception signal y(l) is formed according to the formula:

$$y(l) = a \cdot \left( \sum_{i=N_r}^{N-1} b_{tr}(T* - iT + lT_a) \right) \cdot e^{j \cdot 2 \cdot \pi \cdot f_D \cdot T_a \cdot l + j \cdot \phi'}. \quad (2)$$

Here the demodulated echo signal was sampled exactly once per sub-pulse (of the analog-digital converter); in other words, a sampling period $T_a$ is used (FIG. 1). The two most crucial parameters in Formula (2) are the transit time $t_r$ of an encoded pulse and the Doppler shift $f_D$ of the emitted signal. With the speed of light c, the following formulas are formed:

$$t_r = 2 \cdot r/c, \quad (3)$$

$$f_D = 2 \cdot (\underline{V_F} - \underline{V_a} \cdot \underline{r_0}/\lambda) \text{ and}$$

$$N_r = \text{Int}[t_r/T], r$$

where λ represents the wavelength of the transmission signal and Int[ ] represents the function "largest whole number of."

The received encoded signal $b_{tr}(t)$, which was renamed in Formula (2), indicates that the received signal $b_r(t)$ is completely, partially or not at all gated out, depending on the transit time $t_r$. The further parameters in Formula (2) are the reception amplitude a and the time T*, with which a predeterminable temporal delay that is essentially determined by the design of the analog/digital converter occurs during sampling.

Following the sampling, the reception signal y(l) (Formula (2)) passes through a so-called matched filter $m_F(l)$, which is matched to the transmission signal and to the non-gated-out transmission code $B_x(t)$. If L is the length of the transmission code, an output signal $y_b(l)$ is formed after the matched filter $m_F(l)$ according to the formulas:

$$y_b(l) = m_F(l) * y(l) \text{ with } m_F(l) = b(L-l), \quad (4)$$

where * represents the folding operator.

Figure 3:
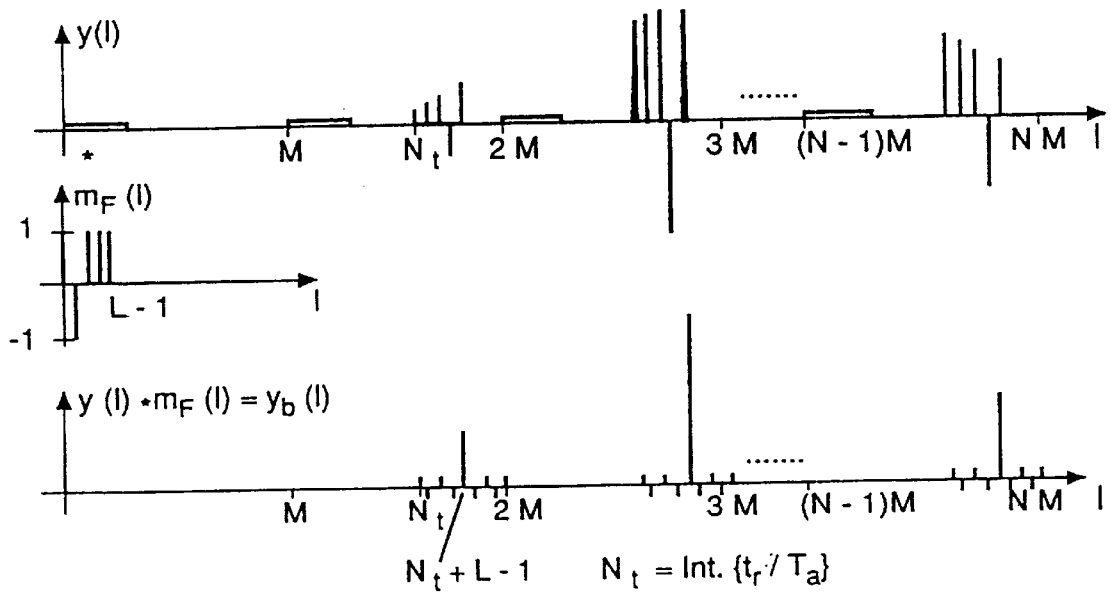

FIG. 3 illustrates the folding of the reception signal y(l) with the matched filter $m_F(l)$.

It is advantageous to select the sampling frequency $f_a$ used in the analog-digital conversion as a whole-number multiple M of the used, predeterminable pulse-repetition frequency PRF according to the formulas:

$$f_a = M \cdot PRF \text{ with } PRF = 1/T \text{ and } f_a = 1/T_a. \quad (5)$$

It is now possible to order the sampling values $y_b(l)$, which were determined according to Formula (4), in the form of a matrix $a_b(k, i)$ according to the formula:

$$a_b(k, i) = \begin{pmatrix} y_b(M \cdot k + 0) \\ y_b(M \cdot k + 1) \\ \vdots \\ y_b(M \cdot k + i) \\ \vdots \\ y_b(M \cdot k + M - 1) \end{pmatrix}, \text{ with} \quad (6)$$

k=0, . . . , N−1 and i=0, . . . , M−1.

From Formula (6), it follows that a distance range can be allocated to each line vector. It is known that, in a radar system, the unambiguous distance range $R_e$ can be determined according to the formula:

$$R_e = c \cdot T/2 = c/(2 \cdot PRF). \quad (7)$$

If this unambiguous distance range $R_e$ is divided into exactly M distinguishable distance ranges, the length $R_L$ of a range gate or bin can be determined according to the formula:

$$R_L = R_e/M = (c \cdot T)/(2 \cdot M); \text{ with } T = M \cdot T_a, \text{ it follows that } R_L = c \cdot T_a/2. \quad (8)$$

Figure 4:
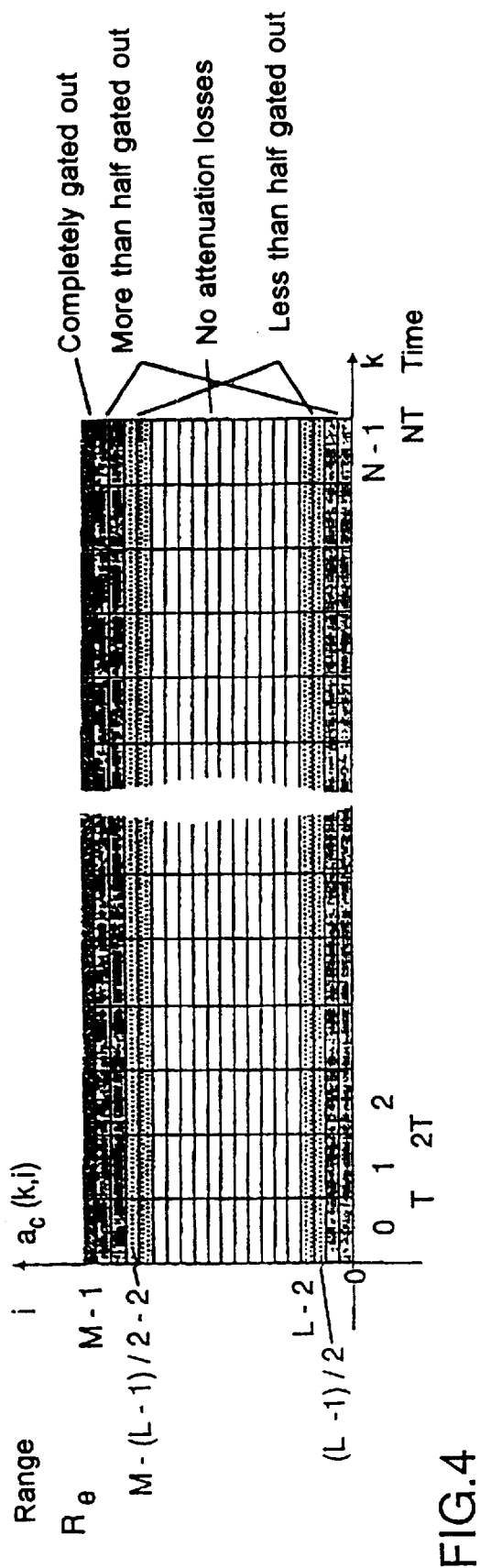

Thus, a time-range matrix is formed, which is shown in FIG. 4.

Figure 5:
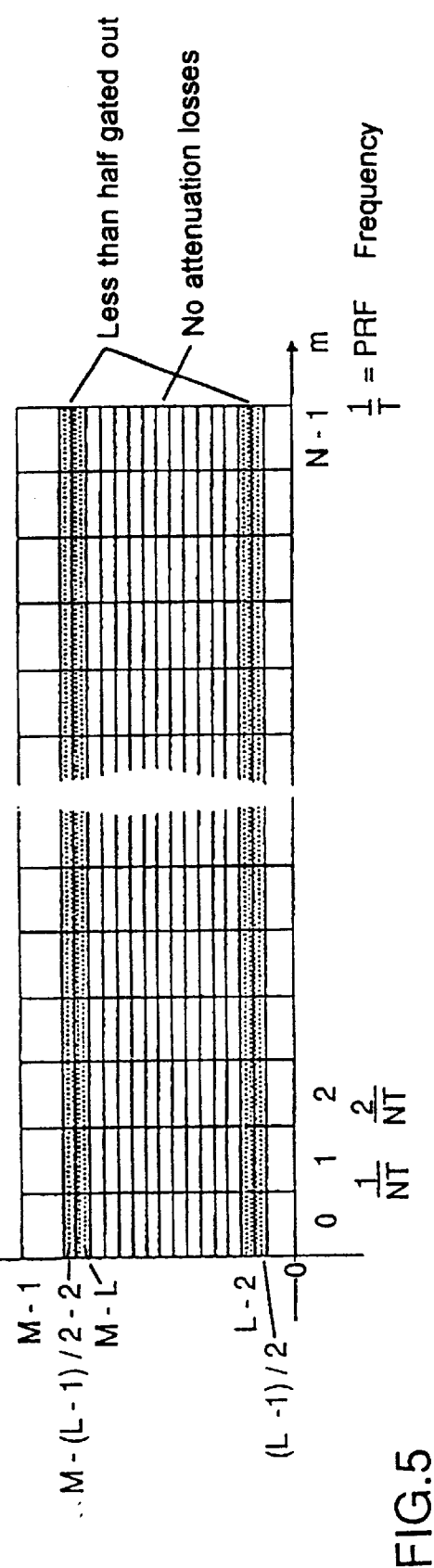

This time-range matrix is transferred into a frequency-range matrix F(m, i) by means of a Fourier transformation, preferably a DFT ("Discrete Fourier Transformation") or an FFT ("Fast Fourier Transformation") according to the formula:

$$F(m, i) = \sum_{k=0}^{N-1} w(k) \cdot a_b(k, i) \cdot e^{j \cdot 2 \cdot \pi \cdot m \cdot k/N} \quad (9)$$

with 0≦i≦M−1 and m=0, 1, . . . , N−1. Here w(k) represents a predeterminable window function, for example a Dolph Chebyschev window, that serves to suppress secondary lobes in the frequency range. FIG. 5 illustrates such a frequency-range matrix.

If the lower limit of the pulse-repetition frequency PRF, for example, is selected according to the formula:

$$PRF \geq 130 \text{ kHz},$$

with Formula (7) the upper limit of the unambiguous distance range ensues from the formula:

$$R_e \leq 1154 \text{ m}. \quad (10)$$

If the maximum length $R_L$ of a range gate is predetermined as a function of what is assumed to be the largest target dimension according to $R_L = 25$ m, it follows from Formula (8) that, for determining the maximum number M of range gates within the unambiguous distance range, $$M \leq 46. \quad (11)$$

If, for example, a radar system is designed for a maximum range of about 100 km, and a (radar) target is detected in the range gate $i_m$, exactly 100 ambiguous range gates $i_e$ are to be associated with this target, according to the formula:

$$i_e = i_m + u \cdot M, \quad (12)$$

with $0 \leq i_m \leq M-1$ and $0 \leq u \leq \text{Int}[R_w/R_e]$, and with $R_w$ representing the desired unambiguous range. The position of the target within the unambiguous distance range is determined by means of a known switching of the pulse-repetition frequency from burst to burst, and an evaluation by means of the so-called Chinese remainder set, which will be explained in detail below.

Figure 6:
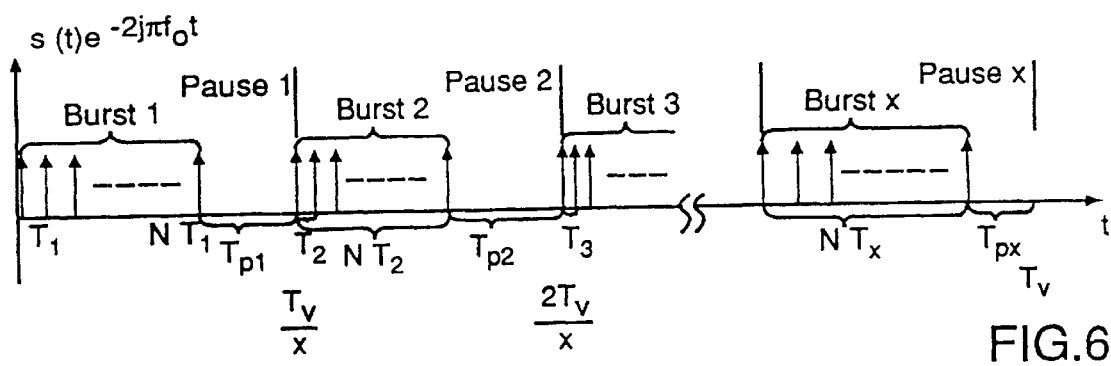

To resolve the aforementioned ambiguities in the distance range, numerous different pulse-repetition frequencies PRF are required, because interferences such as attenuation and other losses are present in a real applications. FIG. 6 shows a course over time of a predeterminable processing cycle, in which x different PRFs, which are run through consecutively (cyclically) are used. It is predetermined that the number N of pulses remains constant for each burst.

Accordingly, a processing cycle comprises x different bursts of the length $N \cdot T_j$, with $1 \leq j \leq x$ and x different lengths of pause times $T_{pj}$, and $1 \leq j \leq x$, which are selected such that the following formula applies:

$$(NT_j + T_{Pj}) = \text{const.} = T_v/x \text{ with } 1 \leq j \leq x. \quad (13)$$

The described selection of the pause times $T_{Pj}$ according to Formula (13) is not a necessity; however, with it the mathematic representation of the signal processing as described below becomes simpler and easier to oversee.

To generate the transmission signal, each individual pulse within a burst is folded with a predeterminable transmission code. Before the ambiguities occurring in the distance range can be resolved by means of the different pulse-repetition frequencies, however, the individual matrices must run through a pre-processing in the form of a compensation of the target motion (motion of a target), which will be explained below.

If a pre-processing cycle according to FIG. 6 has ended, x matrices:

$$F_j(m,i), \text{ with } 0 \leq m \leq N-1, \, 0 \leq i \leq M_j-1, \, 1 \leq j \leq x \quad (14)$$

must be processed.

A current matrix that is always characterized hereinafter with:

$$F_1(m,i) \text{ with } 0 \leq m \leq N-1 \text{ and } 0 \leq i \leq M_1-1 \quad (15)$$

because of the cyclical running of the different pulse-repetition frequencies is evaluated. This current matrix $F_1(m,i)$ is then compared to the x−1 previous matrices, which, however, contain target data for other times. It is assumed that the target moves at a constant velocity $v_1$ within the processing time $T_v$. Then the target position for a target that appears in the matrix $F_j(m,i)$ with the target data $r_1$ and $v_1$ has changed by the following difference $\Delta r_j$—see FIG. 2:

$$\Delta r_j = r_j - r_1 v_j (j-1) \cdot T_v/x, \text{ with } v_1 = (V_F - V_a) r_0 \text{ and } = 1, 2, \ldots, x. \quad (16)$$

The length of a range gate is $R_L$. If the following formula applies:

$$|\Delta r_j| \geq z \cdot R_L, \quad (17)$$

a target, for example an aircraft, has flown over at least z range gates up to the "j-th comparison matrix." The velocity $v_1$, can be determined from the current matrix $F_1(m,i)$. For this purpose, the relationship:

$$f_{D1} = (2 \cdot f_0/c) \cdot v_1$$

is used to allocate the discrete frequency variable $M_{Dj}$ corresponding to the j-th matrix to the velocity $v_1$, according to the following guidelines:

1) at $v_1 > 0$, i.e., a target is approaching the antenna, then:

$$m_{Dj} = f_{D1} \cdot N \cdot T_j; \quad (18a)$$

2) at $v_1 < 0$, i.e., a target is moving away from the antenna, then:

$$M_{Dj} = N + f_{D1} \cdot N \cdot T_j. \quad (18b)$$

If Formulas (18) and (16) are inserted into Formula (17), the following formulas are created:

1) at $v_1 > 0$, $$m_{Dj}(z) \geq \frac{T_a}{T_v} \cdot \frac{x}{j-1} \cdot f_0 N T_j z \quad (19a)$$

2) at $v_1 < 0$, $$m_{Dj}(z) \leq -z \frac{T_a}{T_v} \cdot \frac{x}{j-1} \cdot f_0 N T_j + N, \quad (19b)$$

with $0 \leq m_{Dj} \leq N-1$ and $2 \leq j \leq x$.

Because $m_{Dj}$ is a whole number, Formulas (18) and (19) are mathematically inexact. An error occurs, which is, however, negligible with a large N ($N > 1024$).

From Formula (19) it becomes apparent that targets whose discrete frequency variable satisfies Formula (19) in the j-th matrix are positioned closer to the antenna ($v_1 > 0$) by z range gates in the current matrix, or are further from the antenna ($v_1 < 0$) by z range gates in the current matrix.

If the temporally-previous matrices $F_j(m,i)$ are compared to the current matrix and the range ambiguities are resolved, for example by means of the Chinese remainder set, the differences in position must be compensated. In the process, a compensated matrix $F_{jk}(m,i)$ is created, which follows from the matrix $F_j(m,i)$ through the following operations:

1) at $v_1 > 0$, $$F_{jk}(m,i) = \begin{cases} F_j(m,i); & \text{for } 0 \leq m < m_{Dj}(1) \\ F_j(m, (i-1) \bmod M_j); & \text{for } m_{Dj}(1) \leq m < m_{Dj}(2) \\ \vdots & \\ F_j(m, (i-z) \bmod M_j); & \text{for } m_{Dj}(z) \leq m < m_{Dj}(z+1) \\ \vdots & \end{cases} \quad (20a)$$

2) at $v_1 < 0$, $$F_{jk}(m,i) = \begin{cases} F_j(m,i); & \text{for } N-1 \geq m > m_{Dj}(1) \\ F_j(m, (i+1) \bmod M_j); & \text{for } m_{Dj}(1) \geq m > m_{Dj}(2) \\ \vdots & \\ F_j(m, (i+z) \bmod M_j); & \text{for } m_{Dj}(z) \geq m > m_{Dj}(z+1) \\ \vdots & \end{cases} \quad (20b)$$

Figure 7:
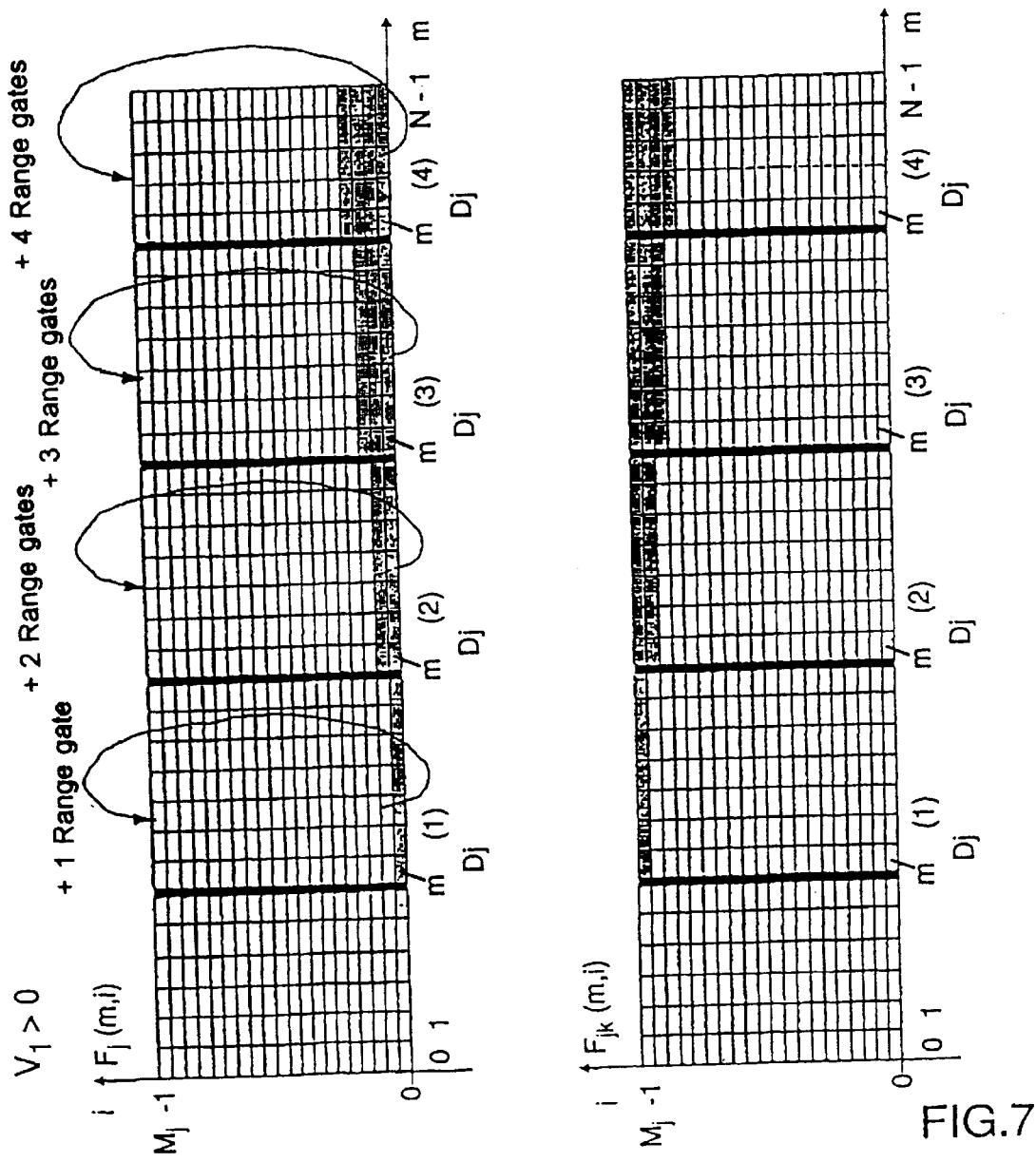

This process is illustrated for $v_1>0$ in FIG. 7. Here, certain, predeterminable line segments are to be shifted by the line number corresponding to the range gates over which the target flies. As prescribed by the module operation mod in Formula (20a), the line segments appearing at the bottom in the matrix are re-inserted at the top, as indicated by arrows in FIG. 7.

If a plurality of pulse-repetition frequencies is required for determining range, the range of a target can basically be determined precisely on the basis of only two range gates. This is because the precise position of a target is not known exactly within a range gate, and the target can therefore enter an adjacent range gate during a change in pulse-repetition frequency. If a target is, for example, at the edge of a range gate, a relatively-low velocity suffices to shift the target into an adjacent range gate at the subsequent PRF. Such a target migration, however, cannot be corrected with the above-described method, and must therefore be considered in the selection of the pulse-repetition frequencies.

Figure 8:
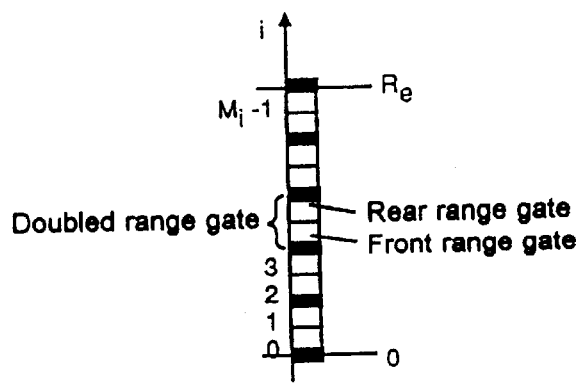
Figure 9:
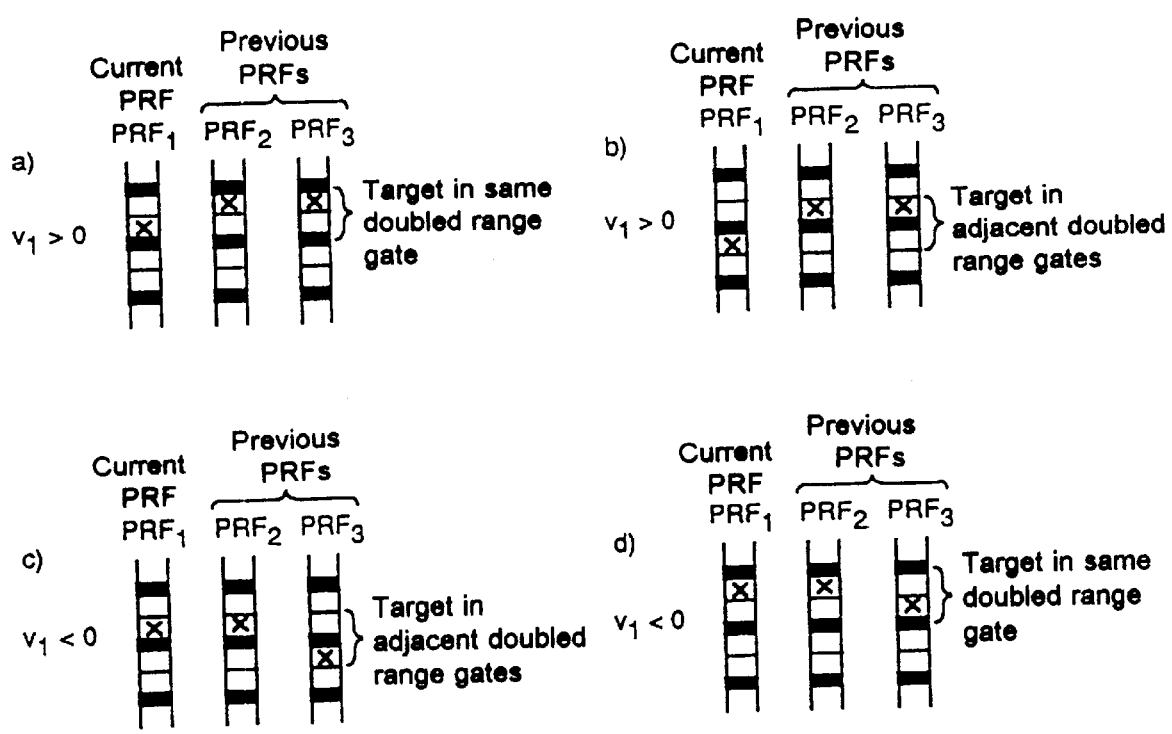

The pulse-repetition period Tj associated with a pulse-repetition frequency is determined through the number of associated range gates Mj according to the formula:

$$T_j = M_j T_a, \quad (21)$$

where $T_a$ represents the sampling frequency that determines the length $R_L$ of a range gate according to Formula (8). Because of the possible target migration from one range gate into an adjacent range gate during a change in the pulse-repetition frequency, it is advantageous to select the number $M_j$ of the range gates within a pulse-repetition period as a whole-number multiple of the number. The unambiguous distance range can thus be divided into doubled range gates according to FIG. 8. Hence, the unambiguous distance range can be subdivided into $M_j/2$ so-called doubled range gates. A doubled range gate therefore comprises a front and a rear range gate (with respect to the antenna-target direction). The front range gates are characterized by an even-running index, and the rear range gates with an odd-running index. FIGS. 9a through 9d show the possible range positions of a target (represented by X) in different range gates associated with different PRFs. Four possible cases are shown. If $v_1>0$ and the target X is located in a front range gate at the current PRF, it is at the temporally-previous PRFs in the same doubled range gate. If, in contrast, the target appears in a rear range gate at the current PRF, and $v_1>0$, it is possible that the target was in a different doubled range gate at the previous PRFs.

It follows from FIGS. 9a through 9d that exactly the reverse conditions are present for $v_1<0$.

It is apparent that, with an optimum utilization of the pulse-repetition frequencies, a target must be prevented from wandering from one range gate into an adjacent doubled range gate during a change in pulse-repetition frequency, because then a disturbing error occurs in the determination of the range.

In the following cases, therefore, a correction must be effected within the matrices $F_{jk}(m,i)$:
Case 1: $v_1>0$ and the target is located at the current PRF in a rear range gate at the current PRF.
Case 2: $v_1<0$ and the target is located in a front range gate at the current PRF.

Figure 10A:
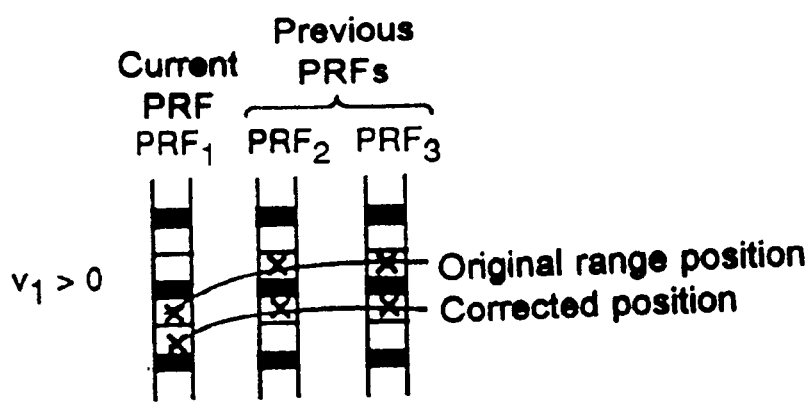
FIG. 10a shows the advancement by one range gate at the current PRF and all temporally-previous PRFs to correct the target position.

The following corrections must be undertaken:
For Case 1, $v_1>0$:
  The target X must be advanced by one range gate at the current PRF and all temporally-previous PRFs. This correction of the target position is illustrated in FIG. 10a.

Figure 10B:
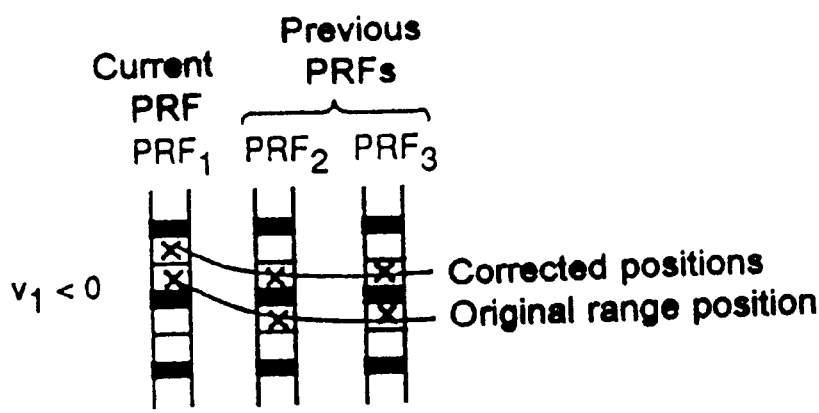
FIG. 10b shows the setting back by one range gate at the current PRF and all temporally-previous PRFs to correct the target position.

For case 2, $v_1<0$:
  The target X must be set back by one range gate at the current PRF and all temporally-previous PRFs. This correction of the target position is illustrated in FIG. 10b.

The selection of the pulse-repetition frequencies is described below. Here $$M \leq 46 \quad (22)$$

results for the maximum number M of range gates for the case corresponding to Formula (11).

Because a range determination with more than one pulse-repetition frequency can only be precise on a doubled range gate, only this range division (raster with doubled range gates) is used hereinafter. For the maximum number M' of doubled range gates, the following applies:

$$M'=M/2 \leq . \quad (23)$$

The lower limit of M' results from a maximum assumed duty cycle of 0.4 and the selection of the transmission-code length L as:

$$L/(2 \cdot 0.4) \leq M' \leq . \quad (24)$$

The pulse-repetition periods $T_j=1/PRF$ are now directly proportional to the number of their doubled range gates $M_j'$ according to the formula:

$$T_j = (4 \cdot M_j' \cdot R_L)/c. \quad (25)$$

The composition of the PRFs is determined below, in which possible attenuation losses and the desired, expanded unambiguous range must be considered.

If only two different pulse-repetition frequencies are used in range determination, according to Formula (12):

$$i_e' = i_{m1}' + u_1 \cdot M_1' \text{ with } 0 \leq i_{m1}' \leq M_1' \, i_e' = i_{m2}' + u_2 \cdot M_2'$$
$$\text{with } 0 \leq i_{m2}' \leq M_2'. \quad (26)$$

These formulas differ from Formula (12) only in that canceled (indicated by "'") running variables are used. These variables relate to the following use of doubled range gates. If $M_1'$ and $M_2'$ are relatively prime, the following formula applies for the expanded unambiguous range:

$$0 \leq i_e' < M_1' \cdot M_2'. \quad (27)$$

If $M_1'=23$ and $M_2'=22$ according to Formula (23), the unambiguous distance range $R_w$ is determined according to the formula:

$$R_w = 22 \cdot 23 \cdot 50 \text{ m } R_w = 25.3 \text{ km}. \quad (28)$$

Because, in a real case, with the use of only two pulse-repetition frequencies, the attenuation losses are disturbingly high, the described two-out-of-two detection is not practical. Therefore, hereinafter, beginning with $M_1'$, the next three smaller numbers, which must be relatively prime with respect to one another, are used and a two-out-of-four detection having the following PRF composition is selected:

$$M_j' = (23, 22, 21, 19). \quad (29)$$

Figure 11:
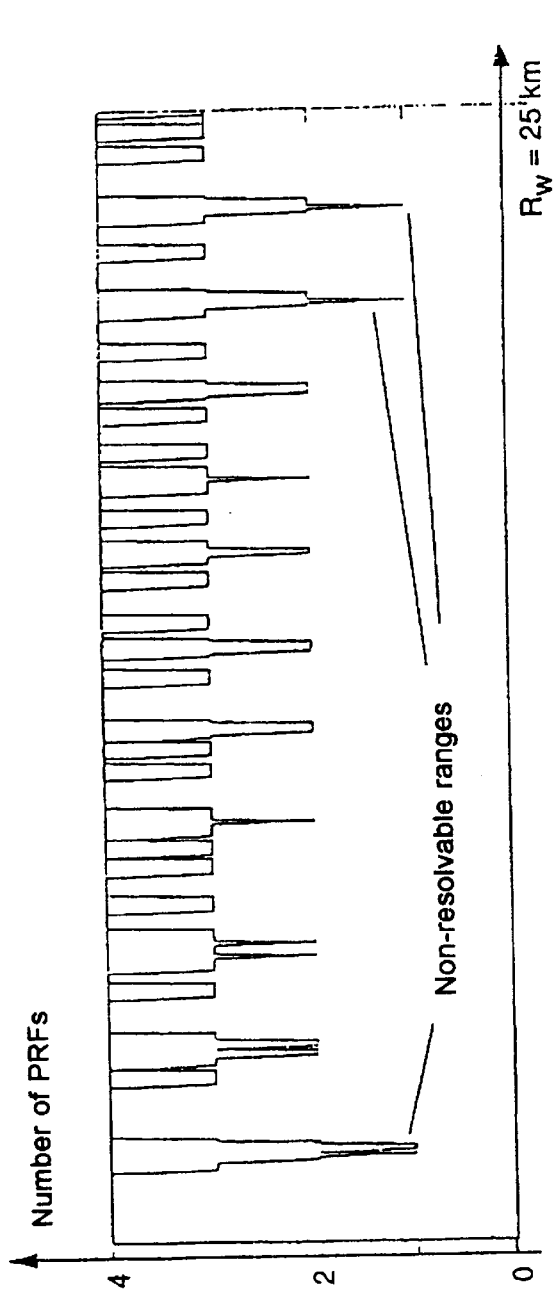

The code length L is selected as L=7. These parameters yield a probability $P_{2D}$ of:

$$P_{2D} = 0.974 \quad (30)$$

that a detected target will not be gated out at least twice with four consecutive PRFs. In other words, for 97.4% of the detected targets, the range can be unambiguously determined within the range $R_w=25.3$ km given in Formula (28). FIG. 11 shows an associated utilization diagram as a function of the range at four different PRFs. The non-resolvable (range) zones are shown.

If a larger, expanded unambiguous range is to be used, a third pulse-repetition frequency is required for determining the range. Analogously to Formula (26), the following formulas apply:

$$i_e'=i_{m1}'+u_1 \cdot M_1' \text{ with } 0 \leq i_{m1}'<M_1', i_e'=i_{m2}'+u_2 \cdot M_2' \text{ with } 0 \leq i_{m2}'<M_2', i_e'=i_{m3}'+u_3 \cdot M_3' \text{ with } 0 \leq i_{m3}'<M_3'. \quad (31)$$

For the composition of the PRFs, the expanded unambiguous range $R_w$ must be larger than 100 km, i.e., the following formulas apply:

$$R_w > 100 \text{ km} \quad (32)$$

$R_w = M_1' \cdot M_2' \cdot M_3' \cdot 50$ m>100 km, from which it follows that $$M_1' \cdot M_2' \cdot M_3' > 2000. \quad (33)$$

One possible combination of relatively-prime whole numbers that satisfy the inequality (33) is the combination of the numbers $M_1'=11$, $M_2'=13$, $M_3'=14$. If the next two larger, relatively-prime numbers are added to these, the following five pulse-repetition frequencies result:

$$M_j'=(11, 13, 14, 15, 17). \quad (34)$$

Selected examples for the transmission-code length L are L=5 and L=7. With these parameters, the probability $P_{3D}$ that a target will not be gated out at least three times at five consecutive PRFs is as follows:

$$\text{with } L=5, P_{3D}=0.955 \text{ and with } L=7, P_{3D}=0.891. \quad (35)$$

Accordingly, depending on the selected code length, 90% to 95% of the detected targets in the selected unambiguous distance range of over 100 km can be unambiguously resolved.

Figure 12A:
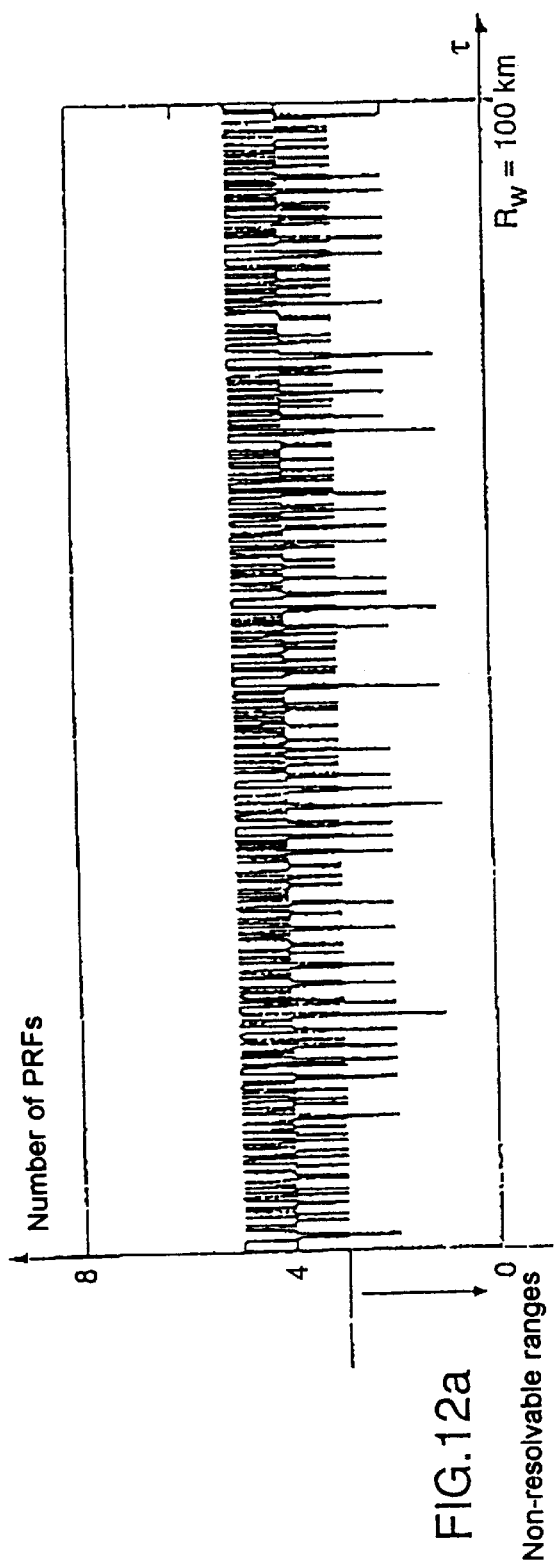
FIG. 12a shows the utilization diagram for the three-out-of-five detection according to formula (34) as a function of the range at five different PRFs with a transmission-code length L=5.

FIG. 12a shows the utilization diagram for the three-out-of-five detection according to Formula (34) as a function of the range at five different PRFs with a transmission-code length L=5.

Figure 12B:
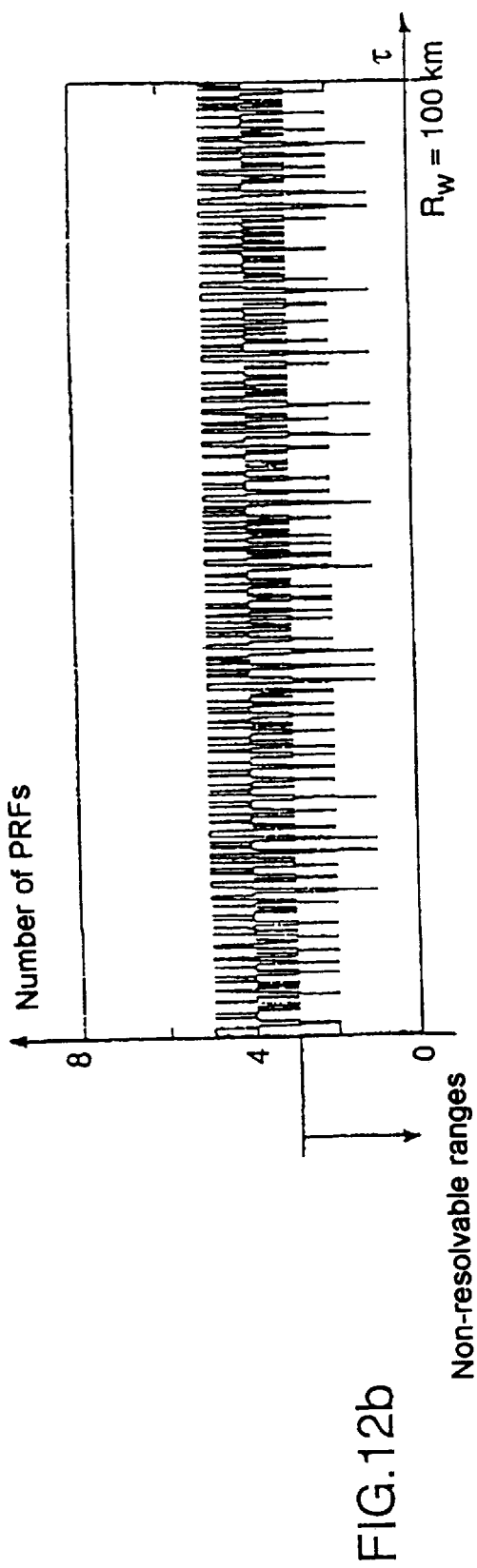
FIG. 12b shows the utilization diagram for the three-out-of-five detection according to formula (34) as a function of the range at five different PRFs with a transmission-code length L=7.

FIG. 12b shows the utilization diagram for the three-out-of-five detection according to Formula (34) as a function of the range at five different PRFs with a transmission-code length L=7.

Because a very high velocity resolution is present in the method, so-called multiple targets can also be separated. It is apparent that multiple targets having approximately the same velocity cannot be separated. This is, however, a limitation with a negligible loss, which is illustrated by way of the following example. The following formula applies for the resolution $dv_j$ in the velocity direction:

$$dv_j = \lambda/(2 \cdot N \cdot T_j) = \lambda/(4 \cdot M_j' \cdot N \cdot T_a). \quad (36)$$

where $\lambda$ represents the wavelength of the transmission signal. If, for example, the parameters N=2048, $\lambda$=0.03 m, $T_a$=166.67 nsec (corresponding to $R_L$=25 m) are selected, with a pulse-repetition frequency $M_j' \geq 11$, the following results as the upper limit for the resolution $dv_j$ in the velocity direction:

$$dv_j \leq 2.0 \text{ m/sec}.$$

Because the same DFT length N is selected for all pulse-repetition frequencies, the frequency resolutions $\Delta f_j$ with j=1, 2, ..., x differ according to the following formula:

$$\Delta f_j = 1/(N \cdot T_j) = (1/N) \cdot PRF_j. \quad (37)$$

Therefore, a target whose velocity does not change appears during a change in PRF in a different (frequency) filter. A target to which the filter $m_1$ is allocated at a current PRF appears at a different PRF in an ensuing filter $m_j$ that follows from the projection:

$$m_j = Int[m_1 \cdot (PRF_1/PRF_j)] \text{ with } j=2, \ldots, x \quad (38)$$

Here, according to the above description, the case of a change in the target velocity during a change in PRF must be observed. A mathematical treatment of this case is difficult, because the acceleration term does not follow from the data matrix. Therefore, the largest-possible acceleration term of 7 g (g=earth's acceleration) is assumed hereinafter, and the change in velocity is described by a linear relationship. Analogously to Formula (16), the maximum change in velocity $\Delta v_j$ between the current matrix and the j-th previous matrix is determined according to the formula:

$$\Delta v_j = |v_j - v_1| \leq 7 \cdot |g| \cdot (j-1) \cdot (T_v/x) = |\Delta v_j|_{max}, \text{ with } j=2, \ldots, x. \quad (39)$$

If this expression is inserted into Formula (38), the resulting range is limited by $m_{ju}$ and $m_{jo}$; the target in the previous matrices may have been in this range, according to the following formulas:

$$m_{ju} = Int\left[m_1 \cdot \frac{PRF_1}{PRF_j} - \frac{2 \cdot \Delta v_j \cdot N}{\lambda \cdot PRF_j}\right] \quad (40)$$

$$m_{jo} = Int\left[m_1 \cdot \frac{PRF_1}{PRF_j} + \frac{2 \cdot \Delta v_j \cdot N}{\lambda \cdot PRF_j}\right]$$

Figure 13:
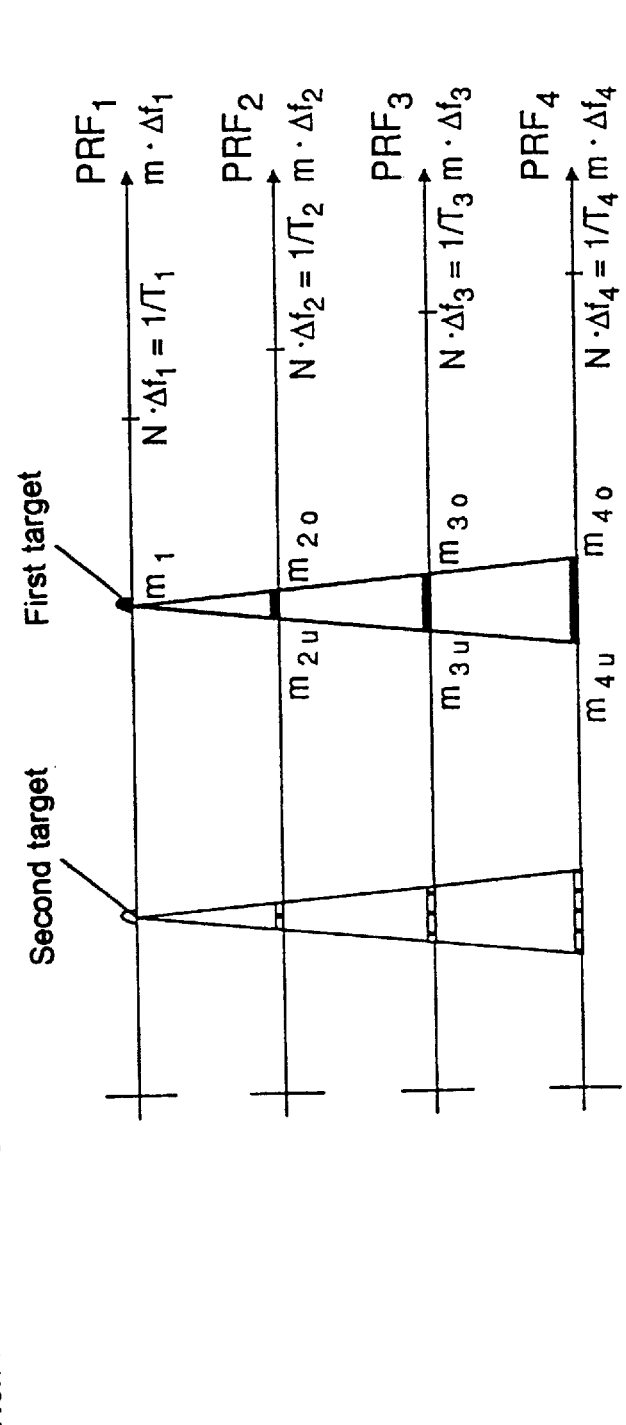

FIG. 13 shows this scenario for a multiple-target resolution in the velocity direction, taking into consideration a constant change in target velocity. A hit, that is, a reliable detection, of a first target at $m_1$ is only reliable if, in a two-out-of-x detection of the PRFs, a further hit occurs at least once at a different PRF, or, in a three-out-of-x detection, at least two further hits occur at two further PRFs within the range $[m_{ju}, m_{jo}]$. The range information corresponding to the hits is used according to Formula (26) or (31) for the range resolution. If a plurality of hits is present within the range $[m_{ju}, m_{jo}]$ at a predeterminable comparison PRF, the hit to which the largest amplitude can be allocated is used to determine the range. It must be taken into account here that, in the range resolution, the simple range gates must be converted into doubled range gates.

While the invention has been disclosed in this patent application by reference to the details of preferred embodiments of the invention, it is to be understood that the disclosure is intended in an illustrative, rather than in a limiting sense, as it is contemplated that modifications will readily occur to those skilled in the art, within the spirit of the invention and the scope of the appended claims.

What I claim is:

1. A method of detecting a target by means of a high pulse repetition frequency (HPRF) radar system comprising the steps of:

consecutively transmitting a plurality of predetermined sequences of modulated sequence of transmission, each sequence of transmission pulses having a respective predetermined pulse repetition frequency, wherein a number of pulse repetition frequencies to be used is predetermined;

after each transmission of predetermined sequences, cyclically switching each transmitted sequence of modulated transmission pulses to a different predetermined pulse repetition frequency;

receiving echo signals comprising transmission pulses reflected by a target;

demodulating the received echo signals with the transmission pulse repetition frequency of the respective modulated transmission pulses;

converting said demodulated echo signals from an analog signal to form a resultant digital reception signal;

first determining an unambiguous target distance range by comparison of ambiguous target ranges of a subset of the plurality of the reflected predetermined pulse repetition frequencies, wherein said unambiguous target distance range has a predetermined length and is divided into a plurality of distinguishable distance ranges;

forming a time-range matrix using the resultant digital reception signals;

transforming said time-range matrix into a frequency-range matrix by means of a Fast Fourier Transform (FFT);

second determining an unambiguous velocity range by means of a range-Doppler matrix having a predetermined number of range-Doppler cells with a predetermined number of Doppler cells being combined into one velocity range; and forming said velocity ranges as a function of the distance range gates and a temporal interval between a sequence of modulated transmission pulses or as a function of the distance range gates over which a target flies.

2. The method according to claim 1, wherein multiple targets travelling at different velocities and accelerations are to be detected by the radar system and further comprising the step of separating multiple targets by means of their different velocities and their highest possible acceleration.

3. The method according to claim 1, wherein the HPRF radar system is located in a moving vehicle.

4. The method according to claim 3, wherein said on-board HPRF radar system is located in an aircraft.

5. The method according to claim 1, wherein said converting step comprises the substeps of:

sampling the analog signal, wherein a predetermined temporal delay occurs; and passing said sampled analog signal through a filter matched to said modulated transmission pulses thereby forming an output signal.

6. The method according to claim 1, wherein said first determining step comprises the substeps of:

combining the distance range gates associated with each pulse repetition frequency into pairs;

subdividing each distance range gate into a front distance range gate and a rear distance range gate with respect to antenna position; and eliminating ambiguous range positions by comparing range measurements for at least three different pulse repetition frequencies by repositioning a distance range gate as a function of velocity direction and by the range position of at least three distance range gates.

7. A method of detecting a target by means of a high pulse repetition frequency (HPRF) radar system comprising the steps of:

consecutively transmitting a plurality of predetermined sequences of modulated sequence of transmission, each sequence of transmission pulses having a respective predetermined pulse repetition frequency, wherein a number of pulse repetition frequencies to be used is predetermined;

after each transmission of predetermined sequences, cyclically switching each transmitted sequence of modulated transmission pulses to a different predetermined pulse repetition frequency;

receiving echo signals comprising transmission pulses reflected by a target;

demodulating the received echo signals with the transmission pulse repetition frequency of the respective modulated transmission pulses;

converting said demodulated echo signals from an analog signal to form a resultant digital reception signal;

first determining an unambiguous target distance range by comparison of ambiguous target ranges of a subset of the plurality of the reflected predetermined pulse repetition frequencies, wherein said unambiguous target distance range has a predetermined length and is divided into a plurality of distinguishable distance ranges;

forming a time-range matrix using the resultant digital reception signals;

transforming said time-range matrix into a frequency-range matrix by means of a Discrete Fourier Transform (DFT);

second determining an unambiguous velocity range by means of a range-Doppler matrix having a predetermined number of range-Doppler cells with a predetermined number of Doppler cells being combined into one velocity range; and forming said velocity ranges as a function of the distance range gates and a temporal interval between a sequence of modulated transmission pulses or as a function of the distance range gates lover which a target flies.

8. The method according to claim 7, wherein said converting step comprises the substeps of:

sampling the analog signal, wherein a predetermined temporal delay occurs; and passing said sampled analog signal through a filter matched to said modulated transmission pulses thereby forming an output signal.

9. The method according to claim 7, wherein said first determining step comprises the substeps of:

combining the distance range gates associated with each pulse repetition frequency into pairs;

subdividing each distance range gate into a front distance range gate and a rear distance range gate with respect to antenna position; and eliminating ambiguous range positions by comparing range measurements for at least three different pulse repetition frequencies by repositioning a distance range gate as a function of velocity direction and by the range position of at least three distance range gates.

10. The method according to claim 7, wherein multiple targets travelling at different velocities and accelerations are to be detected by the radar system and further comprising the step of separating multiple targets by means of their different velocities and their highest possible acceleration.

11. The method according to claim 7, wherein the HPRF radar system is located in a moving vehicle.

12. A method of detecting a target by means of a high pulse repetition frequency (HPRF) radar system comprising the steps of:

emitting a transmission signal comprising a plurality of encoded signals which repeat periodically, said encoded signal being modulated by a predetermined pulse repetition frequency, wherein a number of pulse repetition frequencies to be used is predetermined;

cyclically switching each encoded signal to modulation by a different predetermined pulse repetition frequency;

receiving echo signals comprising said transmission signal reflected by a target;

demodulating the received echo signals with said predetermined pulse repetition frequency;

converting said demodulated echo signals from an analog signal to form a digital reception signal;

sampling the analog form of said reception signal wherein a predetermined temporal delay occurs and wherein a sampling frequency is a whole number multiple of said predetermined pulse repetition frequency;

passing said sampled reception signal through a filter matched to said transmission signal to form an output signal;

determining an unambiguous target distance range by comparison of ambiguous target ranges of a subset of the plurality of the reflected predetermined pulse repetition frequencies, wherein said unambiguous target distance range is divided into a plurality of distinguishable distance ranges and wherein the length of a distance range gate is determined;

forming a time-range matrix;

transforming said time-range matrix into a frequency-range matrix by means of a Fast Fourier Transform (FFT);

determining an unambiguous velocity range by means of a range-Doppler matrix having a predetermined number of range-Doppler cells with a predetermined number of Doppler cells being combined into one velocity range; and forming said velocity ranges as a function of the distance range gates and a temporal interval between a sequence of modulated transmission pulses or as a function of the distance range gates over which a target flies.

13. The method according to claim 12, wherein said first determining step comprises the substeps of:

combining the distance range gates associated with each pulse repetition frequency into pairs;

subdividing each distance range gate into a front distance range gate and a rear distance range gate with respect to antenna position; and eliminating ambiguous range positions by comparing range measurements for at least three different pulse repetition frequencies by repositioning a distance range gate as a function of velocity direction and by the range position of at least three distance range gates.

14. The method according to claim 12, wherein multiple targets travelling at different velocities and accelerations are to be detected by the radar system and further comprising the step of separating multiple targets by means of their different velocities and their highest possible acceleration.

15. The method according to claim 12, wherein the HPRF radar system is located in a moving vehicle.

16. A method of detecting a target by means of a high pulse repetition frequency (HPRF) radar system comprising the steps of:

emitting a transmission signal comprising a plurality of encoded signals which repeat periodically, said encoded signal being modulated by a predetermined pulse repetition frequency, wherein a number of pulse repetition frequencies to be used is predetermined;

cyclically switching each encoded signal to modulation by a different predetermined pulse repetition frequency;

receiving echo signals comprising said transmission signal reflected by a target;

demodulating the received echo signals with said predetermined pulse repetition frequency;

converting said demodulated echo signals from an analog signal to form a digital reception signal;

sampling the analog form of said reception signal wherein a predetermined temporal delay occurs and wherein a sampling frequency is a whole number multiple of said predetermined pulse repetition frequency;

passing said sampled reception signal through a filter matched to said transmission signal to form an output signal;

determining an unambiguous target distance range by comparison of ambiguous target ranges of a subset of the plurality of the reflected predetermined pulse repetition frequencies, wherein said unambiguous target distance range is divided into a plurality of distinguishable distance ranges and wherein the length of a distance range gate is determined;

forming a time-range matrix;

transforming said time-range matrix into a frequency-range matrix by means of a Discrete Fourier Transform (DFT);

determining an unambiguous velocity range by means of a range-Doppler matrix having a predetermined number of range-Doppler cells with a predetermined number of Doppler cells being combined into one velocity range; and forming said velocity ranges as a function of the distance range gates and a temporal interval between a sequence of modulated transmission pulses or as a function of the distance range gates over which a target flies.

17. The method according to claim 16, wherein said first determining step comprises the substeps of:

combining the distance range gates associated with each pulse repetition frequency into pairs;

subdividing each distance range gate into a front distance range gate and a rear distance range gate with respect to antenna position; and eliminating ambiguous range positions by comparing range measurements for at least three different pulse repetition frequencies by repositioning a distance range gate as a function of velocity direction and by the range position of at least three distance range gates.

18. The method according to claim 16, wherein multiple targets travelling at different velocities and accelerations are to be detected by the radar system and further comprising the step of separating multiple targets by means of their different velocities and their highest possible acceleration.

19. The method according to claim 16, wherein the HPRF radar system is located in a moving vehicle.

* * * * *